United States Patent [19]

LeStrange et al.

[11] Patent Number: 5,371,345

[45] Date of Patent: Dec. 6, 1994

[54] GAMING MACHINE CHANGE SYSTEM

[75] Inventors: Michael LeStrange, Brigantine, N.J.; Richard C. Raven; Jay Stone, both of Reno, Nev.

[73] Assignee: Bally Gaming International, Inc., Las Vegas, Nev.

[21] Appl. No.: 946,200

[22] Filed: Sep. 17, 1992

[51] Int. Cl.$^5$ .............................................. G06K 5/00
[52] U.S. Cl. ................................ 235/380; 235/381; 235/382; 235/382.5; 902/23
[58] Field of Search ............ 235/380, 381, 382, 382.5; 364/410; 902/23

[56] References Cited

U.S. PATENT DOCUMENTS

| | | |
|---|---|---|
| 4,283,709 | 8/1981 | Lucero et al. . |
| 4,373,134 | 2/1983 | Grace et al. . |
| 4,494,197 | 1/1985 | Troy et al. . |
| 4,531,187 | 7/1985 | Uhland . |
| 4,544,834 | 10/1985 | Newport et al. . |
| 4,575,622 | 3/1986 | Pellegrini . |
| 4,594,663 | 6/1986 | Nagata et al. . |
| 4,650,977 | 3/1987 | Couch . |
| 4,652,998 | 3/1987 | Koza et al. . |
| 4,669,596 | 6/1987 | Capers et al. . |
| 4,669,730 | 6/1987 | Small . |
| 4,675,515 | 6/1987 | Lucero . |
| 4,689,742 | 8/1987 | Troy et al. . |
| 4,764,666 | 8/1988 | Bergeron . |
| 5,038,022 | 8/1991 | Lucero .................................. 902/23 |
| 5,179,517 | 1/1993 | Sarbin et al. . |

FOREIGN PATENT DOCUMENTS

| | | |
|---|---|---|
| 3271578 | 8/1979 | Australia . |
| 3442778 | 9/1979 | Australia . |
| 2027083 | 5/1984 | Australia . |
| 2157383 | 6/1984 | Australia . |
| 2180460 | 7/1986 | United Kingdom . |

Primary Examiner—Harold Pitts
Attorney, Agent, or Firm—Jenner & Block

[57] ABSTRACT

Providing change to gaming machine players is facilitated by the use of a change card having a memory storing a cash value which a change person can use to input a credit into a gaming machine in exchange for cash from a player. A game monitor unit having a card reader, a keypad and a display is attached to the gaming machine and can be used to authorize and transfer a selected cash value to the credit meter of the gaming machine from the change card. Cash values along with authorizations and security codes are input to the change card at a change station utilizing a similar monitor unit. Financial controls and security can be enhanced by transmitting data relating to change card transactions from the gaming machine and the change station to a central data system.

39 Claims, 1 Drawing Sheet

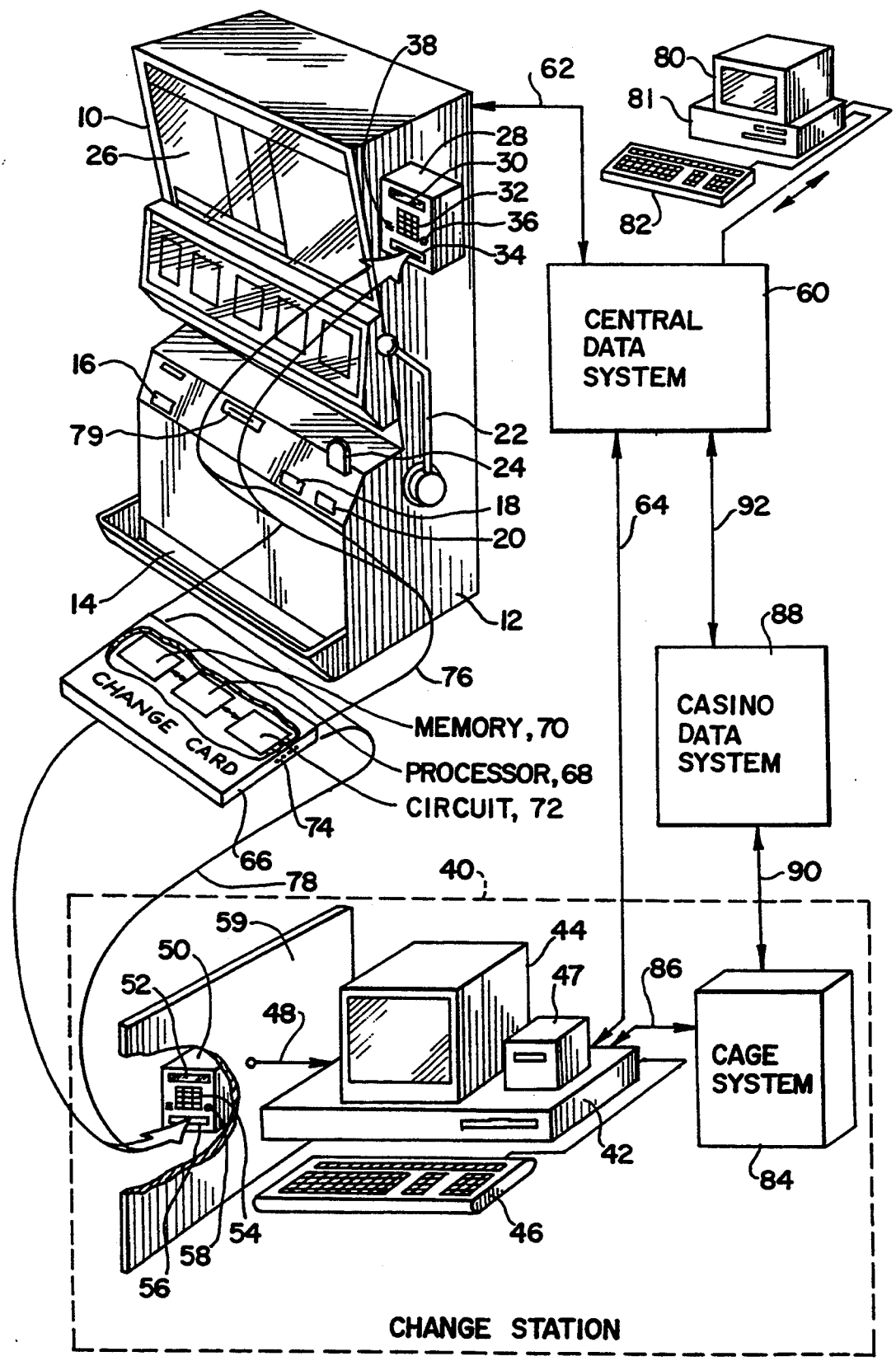

5,371,345

GAMING MACHINE CHANGE SYSTEM

TECHNICAL FIELD

The invention relates to the field of coin operated gaming machines and more particularly to the systems for providing change or credit to operate gaming machines.

BACKGROUND OF THE INVENTION

At present there are a number of methods of providing a player with either credit or coins for playing gaming machines including bill acceptor mechanisms as described in U.S. Pat. No. 5,102,136 and by credit card readers attached to the machines. However, most gaming machines are not equipped with bill acceptors and in many cases players do not possess or want to use a credit card with a gaming machine. As a result, many casinos employ a number of change persons who circulate in the gaming machine area to exchange coins or tokens for currency bills. In order to provide change for players, the change person must normally carry a large number of coins of varying denominations. Very often a casino will have gaming machines that accept, for example, nickels, quarters, fifty cent pieces or dollar coins as well as dollar, five dollar, twenty five dollar or one hundred dollar tokens. In addition to the inherent problems of carrying about a large amount of change on the casino floor, this method of supplying players with change complicates the casino's accounting procedures and increases security concerns. Further, this method requires a substantial inventory of coins to be kept on hand in the casino to supply the players and the machines.

SUMMARY OF THE INVENTION

It is therefore an object of the invention to provide a change system where a change person is provided with a change card having a memory for storing an amount of money and where each gaming machine is provided with a card reader and a keypad so that the change person can enter an amount of credit into the machine in exchange for cash received from a player.

It is a further object of the invention to provide a change system including a game monitor unit connected to a gaming machine having a card reader, a display and a keypad for receiving a change card having a memory in which an initial cash value is entered by a change station. The keypad can be used by a change person to enter a selected cash value into the gaming machine by entering a personal identification number corresponding to an identification number in the card memory and then the selected cash value. In order to maintain security of the change card, the change station can include a station monitor unit having a keypad, a display and a card reader permitting the change person to input the identification number into the card memory. The display can also be used to display the change person's name in association with the input of the initial cash value.

It is an additional object of the invention to provide a change system having a game monitor unit connected to a gaming machine along with a change card having a memory containing cash values and a personal identification number where a change station can be used to input an initial cash value into the card memory along with the identification number and where the card is automatically deactivated after a predetermined amount of time. The card can also be deactivated by the change station or by other components of the system. A cancel function can additionally be included to permit the change person to use the game monitor unit to transfer a cash value that has been transferred to the gaming machine back to the card memory.

It is a further object of the invention to provide a change system having a game monitor unit connected to a gaming machine, a change card having a memory for storing cash values and a change station which includes a station monitor unit having a keypad, a display and a card reader along with a station computer having a keyboard and a computer display where an initial cash value is inputted to the card memory by the computer keyboard. To enhance security, the station monitor unit is not accessible by, nor is it visible to, a cashier operating the station computer and the station monitor unit can be used by a change person to input a confidential personal identification number into the card memory. The identification number is then used to authorize the input of a selected cash value to the gaming machine through use of the game monitor unit keypad.

Another object of the invention is to provide a gaming machine change system where a change card having a memory for holding cash values along with an identification number can be used with a game monitor unit connected to a gaming machine that includes a keypad, a display and a card reader to input a selected cash value to the gaming machine and where an initial cash value and the identification number are inputted to the card memory by a change station. The system can also include a central data system operatively connected to both the gaming machine and the change station where the initial cash values are recorded in the central data system for each card and where the central data system is effective to enter a password into the card memory that is effective to prevent the game monitor unit from accepting a cash value from the card unless the password is present in the card memory. Additionally the central data system can be used to record transactions in parallel with the card.

BRIEF DESCRIPTION OF THE DRAWING

The drawing is a block diagram of a gaming machine change system according to the invention.

DETAILED DESCRIPTION OF THE INVENTION

The drawing provides an illustration of the preferred embodiment of a change system that can be used with a variety of different types of gaming machines and which eliminates the requirement that change persons physically carry coins or tokens. A representative example of a gaming machine is shown at 10 which includes a housing 12, a coin payout tray 14, game control buttons 16–20, a control handle 22 and a coin input slot 24. Also included is a game display 26 which can be a set of rotating reels in a slot machine or a video display in a video gaming machine. Attached to the housing 10 is a game monitor unit 28 that includes a twelve character dot matrix display 30, a keypad 32 and a combined magnetic-smart card reader 34. Also included is a three color LED 36 and a sound module 38. A more detailed description of a monitor unit that is suitable for use as the game monitor unit 28 is provided in co-pending U.S. patent application Ser. No. 07/763,924 filed on Sep. 23, 1991 which is assigned to the assignee of this application. The monitor unit 28 includes a microprocessor (not shown) that is in direct communication with the gaming machine's 10 microprocessor (also not shown). For simplicity, only one gaming machine 10 is shown in the drawing, but it will be understood that normally there will be a number of gaming machines on the casino floor equipped with game monitor units 28.

Included in the change system shown in the drawing is a change station as indicated by the dashed line 40. Contained in the preferred embodiment of the change station 40 is a computer 42 having a video display 44, a keyboard 46 and a card reader 47. The computer 42 can be a commercially available personal computer and can be used to perform additional functions in a casino cashier booth where the change station 40 will normally be located. It should be noted that instead of the card reader 47, a third monitor unit (not shown) similar to the monitor unit 28 including a keyboard and a display can be used to perform the card reading functions for the computer 42. Operatively connected by a line 48 to the computer 42 is a change station monitor unit 50. The change station monitor unit 50 can be similar in construction to the gaming machine monitor unit 28 and includes a alpha-numeric display 52, a keypad 54, a card reader 56, and a LED 58. A wall or screen 59 is provided between the computer 42 and the change station monitor unit 50 in order to prevent a booth cashier operating the computer 42 from gaining access to or observing the display 52 on the change station monitor unit 50.

Another element of the preferred embodiment of the change system shown in the drawing is a gaming machine central data system 60. Such data systems are typically installed in casinos and include a data processing system which is in communication with the gaming machines on the casino floor in order to provide a variety of centralized accounting and security functions relating to the operation of the gaming machines. In the embodiment of the invention shown in the drawing the central data system 60 is in communication with the gaming machine 10 and the computer 42 as illustrated by lines 62 and 64 respectively. It should be noted that the system as described above can be used for a variety of environments including video lottery systems.

An important element of the change system is a change card 66 which is preferably a smart card and as such includes a microprocessor 68, a non-volatile random access memory 70 and a monitor circuit 72. Although the preferred embodiment of the card 66 includes the microprocessor 68, it will be appreciated that many of the system's functions can be preformed with a card having only a memory 70. Communication to external devices is facilitated by the monitor circuit 72 which includes a number of contacts 74. Preferably the contacts 74 conform to an industry standard such as ISO/DIS 78161/1 and 78161/2. The contacts 74 are configured to engage receptacles in the card readers 34 and 56 thereby permitting communication between the card 66 and the monitor units 28 and 50 as indicated by a pair of arrows 76 and 78. An example of a suitable card for use with gaming machines is provided in U.S. Pat. No. 5,179,517, issued Jan. 12, 1993 and assigned to the assignee of this application.

Other data processing elements can be associated with the change system shown in the drawing, including a cage data processing system 84 which is shown connected to the computer 42 by a line 86 and a casino data system 88 that is connected to the cage system 84 by a line 90. The casino data system 88 is also connected as illustrated by a line 92 to the central data system 60.

Operation of the change card system shown in the drawing is described below in terms of its operation in a casino environment. Most casinos employ change persons for providing players with coins or tokens to play gaming machines in exchange for cash. In an illustrative example of the operation of the system, a change person would receive a non-active change card 66 at the beginning of her shift from a booth cashier at the change station 40. The change person then inserts her change card 66 into the card reader 56 of the change station monitor unit 50. The change person then logs on to the central data system 60 by using the keypad 54 and the display 52 to enter a personal identifier such as her casino license number. This information is transmitted via the change station computer 42 to the central data system 60. Alternatively, the booth cashier can enter the personal identifier via the computer keyboard 46. After recognition of the personal identifier by the central data system 60, the booth cashier utilizing the computer 42 enters an initial cash value into the card memory 70. The initial cash value is transmitted from the computer 42 to the monitor unit 50 which in turn transmits this value to the card memory 70. Limits on the maximum value of the initial cash value, for example $800, can be imposed by the central data system 60 or the computer 42 and these limits can be programmed into the system as a function of the class of change personnel or even by individual names. So that the change person can verify the amount inputted into the memory 70 and her name, the monitor unit 50 will display the amount and the change person's name on the display 52. To improve security, the booth cashier can use the card reader 47 to transmit from a cashier's or management card (not shown) a booth identification number or a cashier identification number to the card memory 70. In this manner, the individual or location which issued the card 66 can be identified in order to detect unauthorized issuance of change cards 66.

Upon verification of her name and the initial amount loaded into the card 66, the change person will use the keypad 54 to enter a personal identification number into the memory 70. This identification number is selected by the change person and is known only to the change person. The processor 68 in the card 66 is programmed to prevent activation of the card unless an acceptable identification number has been entered into the memory 70. To increase reliability, the processor 68 can be programmed to prevent activation of the card 66 until the identification number has been entered a second time by the change person. Optionally, the identification number can also be verified and recorded by the central data system 60 and a verification signal transmitted frown the central data system to the card 66 to activate the card 66. The preferred identification number is a four digit number which will be easy for the change person to remember. However, in order to increase card security, it is considered desirable that the station monitor unit 50 or the processor 68 be programmed not to accept certain "weak" identification numbers such as 1111 or 9999. To further increase security, the central data system 60 will also load a daily password into the card memory 70 after the identification number has been verified. Preferably, the password, which is stored in the central data system 60, would not be accessible to either the change person or change station personnel.

After the change card 66 has been loaded with the initial cash value and the identification number, it is removed from the card reader 56 by the change person. The change card 66 is then ready for use by the change person to provide players with change to operate the gaming machine 10.

When a player requests change from the change person to play the machine 10, the change person will insert the change card 66 into the card reader 34 and enter her identification number into the monitor unit 28 utilizing the keypad 32. If the identification number keyed in matches the number in the card memory 70, the password from the card memory 70 will be accessed by the monitor unit 28 and transmitted to the central data system 60 for verification. After verification by the central data system 60, the monitor unit 28 will display an enter message such as "Transfer 0000" on the display 30. The change person after agreeing with the player on an amount and receiving that amount of cash from the player, will use the keypad 32 to enter that selected cash value into the monitor unit 28. The selected cash value is then transmitted to the central data system 60 where limit and reasonableness checks on this value can be performed by the system 60 or preferably by the game monitor unit 28. For example, selected values which are less than the play denomination of the game 10 would not be permitted by the central data system 60. In the case of a $25 machine for instance, a transfer of $10 from the card 66 would be rejected by the system 60. Also, each gaming machine denomination will have a maximum transfer limit established in the central data system 60 or the game monitor unit 28. Additionally, it is considered desirable that a transfer of a selected cash value that would put the gaming machine 10 into a hand pay condition not be permitted. In order to perform this check, either the central data system 60, the game monitor unit 28 or the gaming machine 10 would compare the sum of the credits in the machine 10 and the selected cash value to the lowest hand pay condition amount for that machine 10. In one embodiment of the invention, the booth cashier can use the computer 42 to impose limits on any one cash transaction and these limits are stored in the card memory 70 or alternatively by the central data system 60. Should the selected cash value not conform to the above limits or criteria, an appropriate message will be displayed on the display 30 and the change person will have the option to use the keypad 32 to alter the selected cash value to be transferred to the machine 10.

Once the selected cash value passes the above checks, this amount is added to any existing amount in a credit register (not shown) in the gaming machine 10 and displayed on a credit meter 79 located on the machine 10. The player then has the option of playing the machine 10 or obtaining change by hitting the cashout control button 16. To facilitate casino control of the change cards 66 and operation of the gaming machines 10, the central data system 60 can include an operator terminal 81 equipped with a display 80 and a keyboard 82. For example, the terminal 80 can be used to display the amount transferred from the card 66 to the machine 10 and the equivalent machine credits as long as the card 66 is in the reader 34. The terminal 81 can also display the current cash value in the card memory 70 as well as the requested amounts to be transferred to the machine 10 and any problems with the transfer as described above. It should be noted however, that due to the basic integrity of the change card 66, especially where encryption algorithms are used to encrypt data in the memory 70 and data transfers, it is not necessary that the central data system 60 approve the cash value transfers described above but it is desirable that a record of the transfers be maintained in the system 60.

In the event that the change person transfers a cash value to the machine 10 different from the amount tendered by the player, the monitor unit 28 is programmed to respond to a predetermined sequence of key inputs from the keypad 32 to cancel the transfer and transfer this amount from the credit register of the machine 10 to the card memory 70. Preferably this cancel function is disabled after the first credit is played on the machine 10.

When the cash value in the card memory 70 is decreased below a predetermined amount, the change person can be notified by a number of different methods. First, the monitor unit 28 can be programmed to display a low balance message on the display 30 when the card is inserted in the card reader 34. Alternatively, the monitor unit 28 can be programmed to blink the LED 36 red or emit a characteristic sound from the sound module 38. The change person can also query the cash value in the card memory 70 at any time by inserting the card in either monitor unit 28 or 50 and pressing a predetermined sequence of keys on the keypads 32 or 54.

To replenish the cash balance in the memory 70, the change person returns to the change station where the booth cashier counts the cash collected by the change person and enters this amount into the computer 42. The change person then inserts her card 66 into the card reader 56 and establishes its authenticity by entering the identification number via the keypad 54. The amount of cash collected and the cash value in the card memory 70 are transmitted to the central data system 60 and recorded. If the resulting cash value in the card memory 70 plus the cash collected is not equal to the initial cash value, the booth cashier is notified by the central data system 60. Otherwise the value of the cash collected is transmitted through the monitor unit 50 to the card 66 where the processor 68 adds it to the value of the cash remaining in the memory 70. In order to permit the change person to verify the amount entered into the memory 70, the monitor unit 50 scrolls the change person's name and the amount entered on the display 52. After verification, the change person removes the card 66 from the card reader 56 and is ready to resume making change for the casino customers.

When the change person completes her shift, she returns to change station 40 where the booth cashier counts the cash collected by the change person. The change person inserts the change card 66 into the reader 56 and enters her identification number via the keypad 54. The remaining amount in the memory 70 is transmitted to the computer 42 and to the central data system 60 where the central data system 60 records the amount of cash collected by the booth cashier with the amount from the memory 70 and alerts the booth cashier if there is a discrepancy on the display 44. At this point the change person can deactivate the change card 66 by entering her identification number or another code into the monitor unit 50 by the keypad 54. A deactivation message is then displayed on the displays 44 and 52 and the change person then returns the card 66 to the booth cashier. In the event that the change card 66 is lost or otherwise not returned to the change station 40, deactivation of the change card 66 is automatically accomplished by the periodic change of the password by the central data system 60 or alternatively the processor 68 can be programmed to deactivate the card 66 after a predetermined time.

Casino accounting and security is enhanced by the above described system since each transaction involving the change card 66 is recorded by the central data system 60. For example it is possible to produce a comprehensive shift report for each change card 66 including the name of the change person who received the card 66, cash deposited in the card memory 70 and the identification of each gaming machine 10 along with the amount of cash or credits transferred to the machine. However, in the preferred embodiment of the system, the change person's personal identification number is not directly accessible from the central data system 60 or the computer 42 so that the only person that has access or knowledge of this number is the change person. In addition, the physical layout of the change station 40 should be such that neither the booth cashier nor any other change station personnel can gain access to or see the monitor unit 50 or its display 52 as illustrated in the drawing by the wall 59. In the event that the change person should forget the identification number, it is possible for casino personnel to use the change station computer 42 or another computer connected to a monitor unit such as 28 or 50 to determine the identification number and gain access to the cash balance on the card 66. For example, by using a relatively high speed computer such as the central data system 60, each combination of a four digit identification number can be tested for a match with the identification number on the card 66 in a reasonable amount of time.

In the embodiment of the invention shown in the drawing the cage system 84 is used to integrate the accounting of the change station 40 with the accounting, security functions and player tracking performed in the cashier's booth. For example, the cage system 84 can be used for reconciling cash transactions in the cashier's booth including transactions performed in connection with the change station 40. The casino data system 88 receives data from the various cashier's booths and the central data system 60 as well as other casino operations in order to provide casino management with comprehensive information and reports relating to the overall operation of the casino.

We claim:

1. A gaming machine change system comprising:
    a gaming machine;
    a change station;
    a change card including a card memory for storing a cash value;
    a game monitor unit operatively connected to said gaming machine including a first card reader for receiving said change card, first data transfer means for transferring a selected cash value from said card as a credit to said gaming machine wherein a player has the option of playing the gaming machine or obtaining change, a keypad for selecting said selected cash value and a first display for displaying said selected cash value; and
    a station monitor unit operatively connected to said change station including a second card reader for receiving said change card and a second data transfer means for transferring to said card memory an initial cash value to said card memory.

2. The system of claim 1 wherein said card memory includes an identification number and said game monitor unit includes authorization means for receiving an identification input from said keypad and authorizing the transfer of said selected cash value if said identification input matches said identification number.

3. The system of claim 2 wherein said identification number is at least a four digit number.

4. The system of claim 2 wherein said identification number is known only to one change person.

5. The system of claim 2 wherein said station monitor unit includes a keypad and input means for permitting a change person to input said identification number to said card memory via said second keypad.

6. The system of claim 5 wherein said input means requires the person to input said identification number at least twice to activate said identification number in said card memory.

7. The system of claim 5 including means to prevent acceptance of a plurality of predetermined weak identification numbers from being stored in said memory.

8. The system of claim 1 wherein said station monitor unit additionally includes a second display for displaying said initial cash value.

9. The system of claim 8 wherein said second display additionally displays the name of the change person associated with said initial cash value.

10. The system of claim 5 wherein said authorization means includes means for permitting a change person to change said identification number at predetermined intervals.

11. The system of claim 1 wherein said selected cash value must be at least equal to the denomination of said gaming machine.

12. The system of claim 1 wherein said gaming machine is a credit gaming machine and includes means to prevent said transfer of said selected cash value if said selected cash value would put said gaming machine into a hand paid condition.

13. The system of claim 1 wherein said first data transfer means includes cancel means for transferring said selected cash value from said gaming machine to said card memory.

14. The system of claim 1 wherein said first data transfer means responds to an input from said game monitor unit keypad to display said selected cash value on said first display.

15. The system of claim 1 wherein said first game monitor unit includes an indicator light and said light is flashed when said selected cash value is below a predetermined amount.

16. The system of claim 1 wherein said first game monitor unit includes sound means for generating a distinctive sound when said selected cash value is below a predetermined amount.

17. The system of claim 5 wherein said second input means additionally includes means for inputting said initial cash value into said card memory.

18. The system of claim 17 wherein said station monitor unit displays a change person's name and said initial cash amount value on said second display after said initial cash value has been input into said memory.

19. The system of claim 1 wherein said change card includes deactivation means for automatically deactivating said change card after a predetermined time.

20. The system of claim 19 wherein said deactivation occurs within twenty-four hours of activation of said change card.

21. The system of claim 20 wherein said deactivation occurs approximately eight hours after activation of said change card.

22. The system of claim 5 wherein station monitor unit includes means to deactivate said change card via said station monitor unit keypad.

23. The system of claim 22 wherein said deactivation occurs only after the person enters his identification number on said station monitor unit keypad.

24. The system of claim 1 wherein said change station additionally includes a change station computer having a computer display, a computer keyboard and a memory operatively connected to said station monitor unit and wherein said initial cash value input to said change card is input into said card memory via said computer keyboard.

25. The system of claim 24 wherein said station monitor unit is not accessible to a cashier operating said change station computer.

26. The system of claim 24 wherein said change station computer includes means for permitting a cashier to input cash received from a change person by said computer keyboard into said computer memory and display it on said computer display.

27. The system of claim 1 additionally including a central data system operatively connected to said gaming machine and said change station wherein said selected cash values and said initial cash values are stored in said central data system.

28. The system of claim 27 wherein said card memory includes an identification number and said game monitor unit includes authorization means for receiving an identification input from said game monitor unit keypad and authorizing the transfer of said selected cash value if said identification input matches said identification number.

29. The system of claim 28 wherein said selected cash value and said initial cash value are stored in said central data system in connection with said identification number.

30. The system of claim 29 wherein said central data system includes password means for inputting a password into said card memory through said station monitor unit and for inhibiting said first data transfer means unless said password is in said card memory.

31. The system of claim 30 wherein said password is not accessible for display by said game monitor unit or said change station.

32. The system of claim 30 wherein said password means changes said password at predetermined time intervals.

33. The system of claim 27 wherein said central data system includes a central display for displaying said selected cash value and said initial cash value while said change card is inserted in said first card reader.

34. The system of claim 33 wherein said central data system includes means for indicating on said central display when said cash value in said card memory is below a predetermined value.

35. The system of claim 27 wherein said game monitor unit includes an indicator light and said central data system includes means for activating said indicator light when said cash value in said card memory is below a predetermined value.

36. The system of claim 24 wherein said initial cash values are displayed on said computer display.

37. The system of claim 36 including means for permitting a cashier to input an mount equal to the cash received from a change person by said computer keyboard into said card memory and display it on said computer display.

38. The system of claim 24 additionally including a cage system operatively connected to said change station computer for receiving information from said change station computer including said initial cash value and cash received from a change person.

39. The system of claim 38 wherein said cage system is operatively connected to a casino data system and includes means for transmitting information including said initial cash value and said cash received from the change person to said casino data system.

* * * * *

UNITED STATES PATENT AND TRADEMARK OFFICE
CERTIFICATE OF CORRECTION

PATENT NO. : 5,371,345
DATED : December 6, 1994
INVENTOR(S) : Michael LeStrange, Richard C. Raven, Jay Stone It is certified that error appears in the above-identified patent and that said Letters Patent is hereby corrected as shown below:

Column 4, line 55, delete "frown" and insert --from--

Column 6, line 35, delete "the-cash" and insert --the cash--

Column 10, line 28, delete "mount" and insert --amount--

Signed and Sealed this

Eleventh Day of April, 1995

Attest:

BRUCE LEHMAN

Attesting Officer    Commissioner of Patents and Trademarks